United States Patent [19]
Bindernagel et al.

[11] 3,787,942
[45] Jan. 29, 1974

[54] ROLLS

[75] Inventors: Ali Bindernagel, Dusseldorf-Gerresheim; Friedrich Karl Mattheis, Heiligenhaus, both of Germany

[73] Assignee: Firma Friedrich Kocks, Dusseldorf, Germany

[22] Filed: Feb. 9, 1972

[21] Appl. No.: 224,877

[30] Foreign Application Priority Data
Nov. 2, 1971 Germany.................... 2106549

[52] U.S. Cl. ............................................. 29/125
[51] Int. Cl. ........................................... B21b 31/08
[58] Field of Search...... 29/129.5, 123, 132, 125, 29/148.4 D

[56] References Cited
UNITED STATES PATENTS

| | | |
|---|---|---|
| 2,342,159 | 2/1944 | Moran .................................. 29/125 |
| 3,432,902 | 3/1969 | Rackoff et al. ........................ 29/125 |
| 3,435,499 | 4/1969 | Rackoff et al. ........................ 29/125 |
| 3,609,849 | 10/1971 | Krol ...................................... 29/132 |
| 3,667,096 | 6/1972 | Edsmar................................. 29/125 |

Primary Examiner—Alfred R. Guest
Attorney, Agent, or Firm—Buell, Blenko & Ziesenheim

[57] ABSTRACT

A roll is provided for metal rolling having a main rotary body, a hard tire providing a rolling surface and having a cross section which increases in width from the rolling surface toward the roll axis and two collars attached to the periphery of the main body and firmly enclosing a portion of the tire to secure said tire to the body while leaving the rolling surface exposed.

10 Claims, 3 Drawing Figures

ROLLS

This invention relates to rolls and particularly to rolls such as a roll for a small section rolling mill equipped with three roll stands for rolling metal such as steel. In particular, the invention relates to such rolls having a circularly symmetrical main body and a hard metal tire or rim, carried by the main body and forming the rolling surface.

Since the rolling surface of the rolls is subject to great wear and tear as a result of heat, forge scales, pressure, etc., it has become increasingly the practice to provide the rolls with hardened tire to prolong the service life of the rolls.

In a known roll of the type mentioned, for use in a small section rolling mill equipped with three-roll stands, the main body of the roll comprises a high-strength steel disc with a shoulder. The annular hardened metallic tire is placed with a shrink fit onto the disc and lies close to the shoulder. On the side opposite the shoulder, the hard tire is held by a clamping ring, which can be screwed on to the main body and whose external diameter is greater than the internal diameter of the tire. In this way, the tire is pressed by the clamping ring tightly against the main body shoulder and it is held firmly to the main body by friction. In a construction of this kind, the cross section of the tire must be at least be large enough to withstand all external strains including the tensile stresses arising as a result of centrifugal forces.

The invention seeks to provide a roll, in which the cross sectional area of the hard metal tire is made as small as possible in order to reduce rolling costs by decreasing the carbide weight.

According to the invention, the hard tire increases in width from the rolling surface towards the roll axis, and two collars attached to the perimeter of the main body firmly enclose the hard tire leaving the rolling surface free.

In the roll according to the invention, in which the tire is firmly bedded between the collars, the collars absorb substantially all the centrifugal forces acting on the tire as well as the tangential strain arising as a result of the thermal expansion of the main body, so that the tensile stresses in the tire can be to a large extent reduced. The cross section of the hard tire can be kept small, though its minimal dimensions are limited by the shape of the groove.

The collars can be made of steel, possibly of the same quality as the main body.

In order that the hard tire is held firmly between the collars, the latter can be pressed laterally against one another. Alternatively, it is also possible to shrink the hard tire onto the receiving surfaces of the collars or to solder or glue the hard tire to the collars. If necessary, the afore-mentioned measures can be combined also to attach the collars to one another.

In order to counteract the stresses arising in the hard tire as a result of thermal expansion of the main body, the hard tire can be pre-stressed in a circumferential direction, by being provided with a corresponding overdimension.

In the roll according to the invention it is also possible to assemble the hard tire from separate segments. The tire segments, when placed together, can form a curve of somewhat more than 360°, so that, when the tire segments are mounted, they are under slight initial compression.

The invention is further described, by way of example, with reference to the accompanying drawings, in which.

Figure 1:
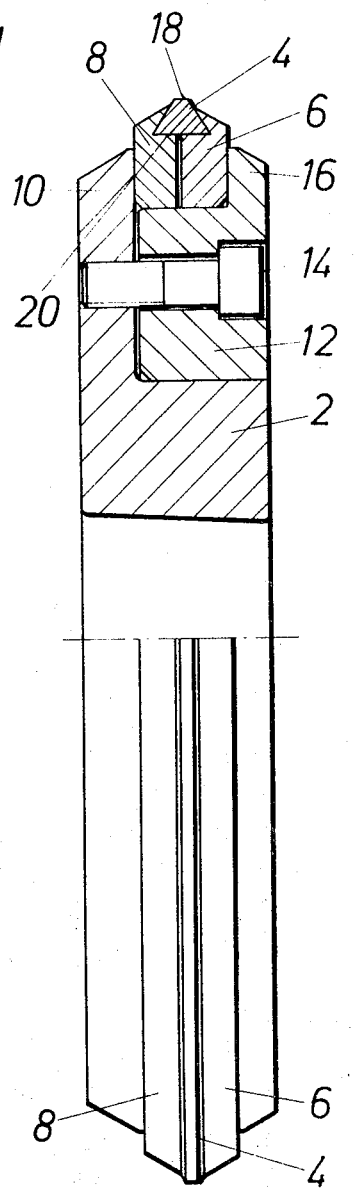
FIG. 1 is a side view of a roll, partly sectioned.

In the embodiment of the invention shown in FIG. 1, one roll for a three-roll stand of a small section rolling mill comprises a main disc-like body 2 adapted to be fixed to the roll spindle, and attached to the main body are two collars 6 and 8 carrying a hard metal tire, such as a carbide tire 4. To secure the collars 6 and 8, the main body 2 has on one side and at right angles to the roller axis a flange 10, to which a clamping ring 12 pushed onto the main body 2 is screwed by means of screws 14 equally distributed around the periphery. The clamping ring 12, whose receiving surface is smaller in diameter than the external periphery of the flange 10 on the main body 2, has on the side opposite the flange 10 a flange 16, which also projects at right angles to the roll axis. When mounted, the collars 6 and 8 are seated on the receiving surface of the clamping ring 12 and, when the screws 14 are tightened, are clamped firmly between the flanges 10 and 16 provided on the main body 2 and the clamping ring 12 and are held by friction.

In the embodiment shown in the drawings, the carbide tire 4 has a trapezoid-shaped cross section, of which the short face 18 is the rolling surface, while the long face 20 and the oblique sides of the trapezium are tightly enclosed by the collars 6 and 8. The collars do not extend radially outwardly as far as the rolling surface 18, when the roll is in its unworn state, so that the outer ends of the oblique trapezium faces 22 are exposed.

Figure 2:
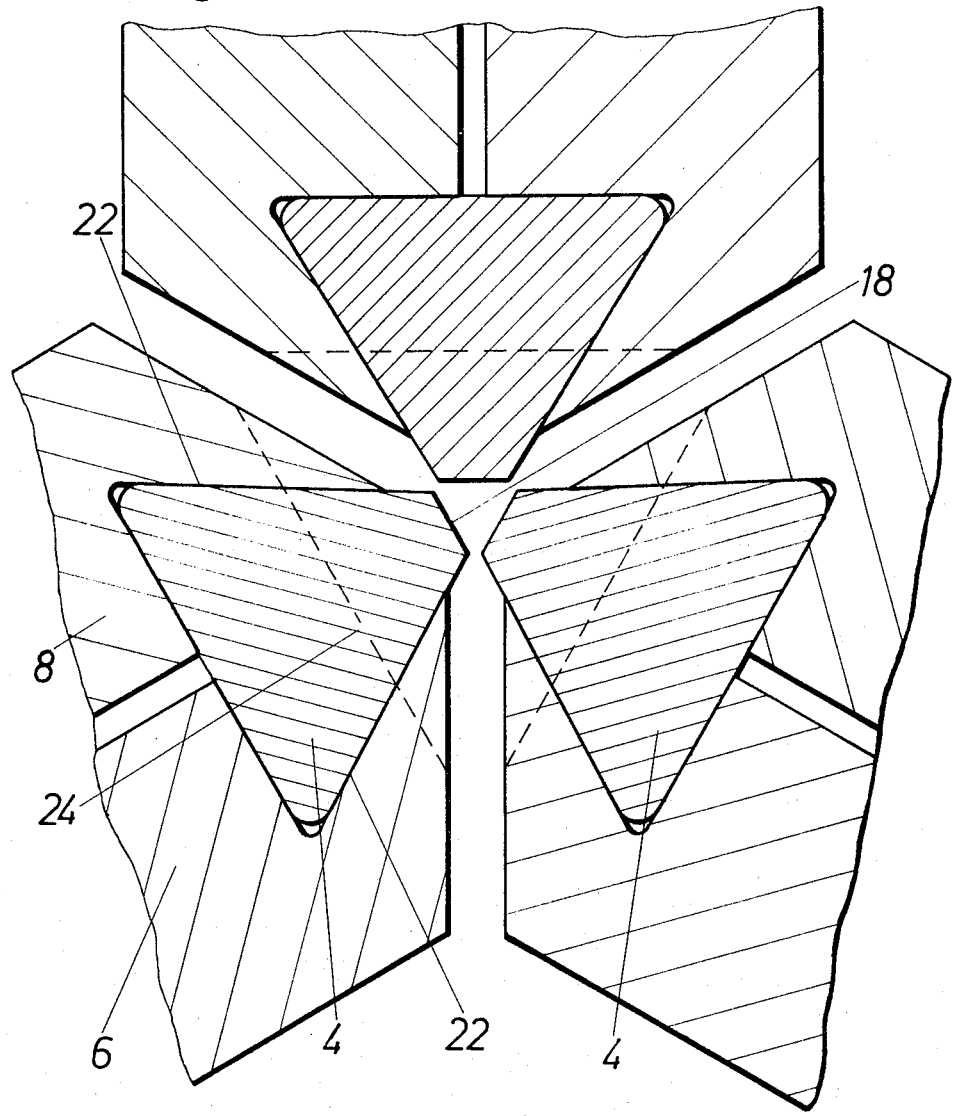
FIG. 2 is a cross section, to a larger scale, of a sizing gap which is formed from three rolls of the type shown in FIG. 1.

Three rolls in accordance with the invention are assembled as illustrated by way of example in FIG. 2 to form a sizing gap. When the sizing gap is worn out, the rolls are re-finished, and the regrinding can be done regardless of the collars 6 and 8 enclosing the carbide tire 4. In the course of their service life, the rolls can, for instance, be ground down to the dotted line 24 shown in FIG. 2 and, in addition to the tire material, the material of the collars enclosing the carbide ring is also ground down. In the re-finished state of the rolls, the carbide rings 4 are still firmly enclosed and held by the collars 6 and 8.

The regrinding of the rolls according to the invention is not limited to the flat-sided sizing gap as shown in FIG. 2, but can be used in a similar way for other conceivable shapes of sizing gap with the same effects and advantages.

Figure 3:
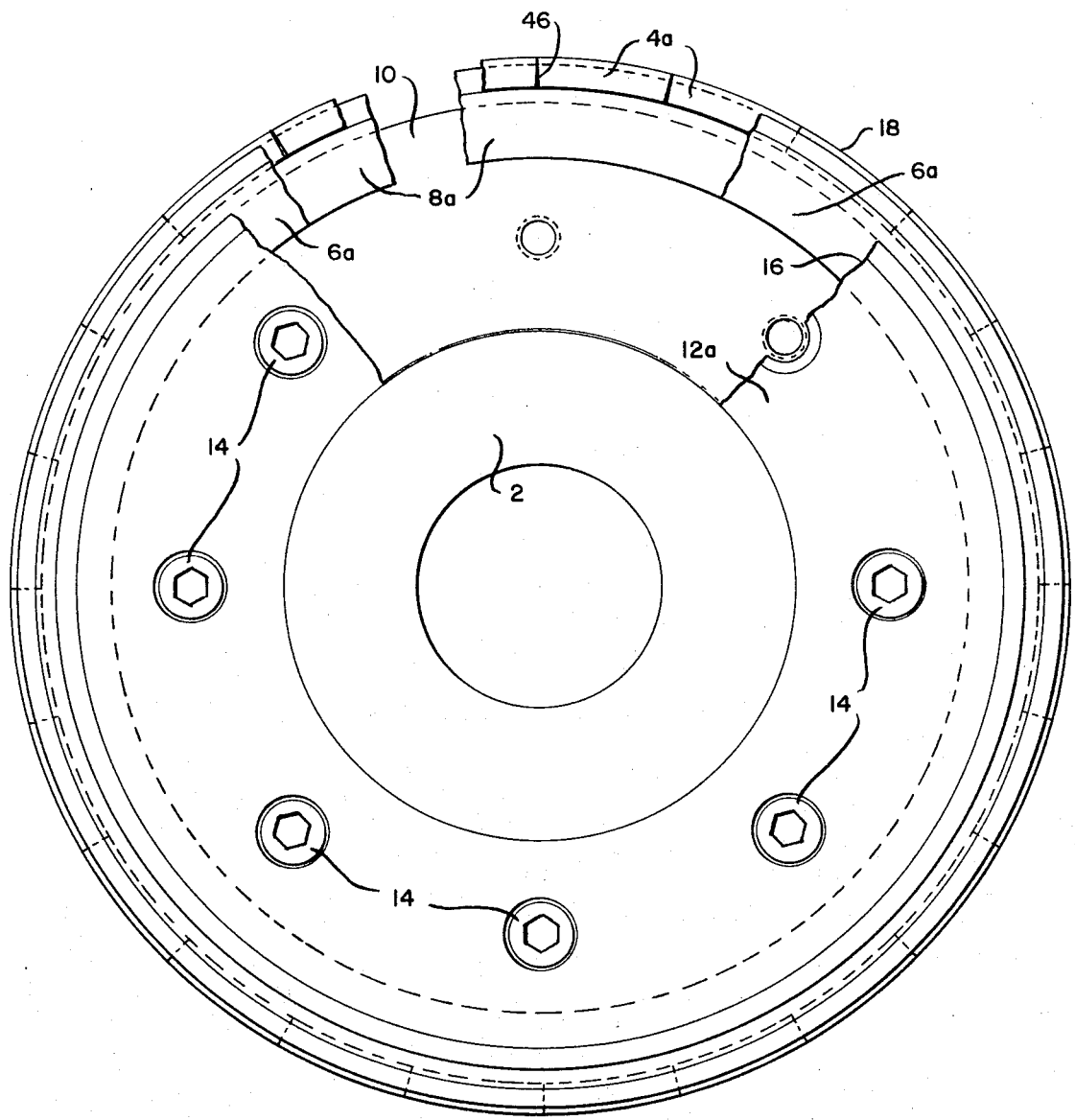
FIG. 3 is a side elevation, partly broken away, of a roll incorporating segments of carbide.

In FIG. 3 we have illustrated a roll having carbide segments 4a making up a tire and held in place precisely as in FIGS. 1 and 2 by collars 6a and 8a and clamping ring 12a. The particular segments 4a illustrated have ends 46 which are cut at an angle such that when placed flush end to end they would have a total included angle greater than 360°.

While we have set out certain preferred embodiments of our invention in the foregoing specification, it will be understood that this invention may be otherwise embodied within the scope of the following claims.

We claim:

1. A roll for metal rolling comprising a main rotary body, a clamping means on the annular periphery of said rotary body adapted for axial clamping action, a hard tire providing the rolling surface and having a cross section which increases in width from the rolling surface towards the roll axis spaced from the rotary body and two collars removably engaged in said clamping means on the periphery of the main body and firmly enclosing a portion of the tire to secure the tire to the main body whilst leaving the rolling surface free.

2. A roll as claimed in claim 1, in which the collars are made of the same material as the main body.

3. A roll as claimed in claim 1, in which the collars can be urged laterally towards one another.

4. A roll as claimed in claim 1, in which the hard tire is soldered or glued to the collars.

5. A roll as claimed in claim 1, in which the hard tire is circumferentially pre-stressed.

6. A roll as claimed in claim 1, in which the hard tire is shrunk onto the collars.

7. A roll as claimed in claim 1, in which the hard tire is formed of separate abutting segments.

8. A roll as claimed in claim 7, in which the segments in their free state form a curve of somewhat more than 360°.

9. A roll as claimed in claim 1, wherein the tire is of truncated triangular section with the apex forming a work surface.

10. A roll as claimed in claim 9, wherein the collars are provided with facing angular grooves receiving the two base angles of the tire.

* * * * *

UNITED STATES PATENT OFFICE
CERTIFICATE OF CORRECTION

Patent No. 3,787,942      Dated January 29, 1974

Inventor(s) Ali Bindernagel et al.

It is certified that error appears in the above-identified patent and that said Letters Patent are hereby corrected as shown below:

Under the heading "FOREIGN APPLICATION PRIORITY DATA", "November 2, 1971", should read --February 11, 1971--.

Column 1, line 27, after "must" delete --be--.

Signed and sealed this 14th day of May 1974.

(SEAL)
Attest:

EDWARD M.FLETCHER,JR.
Attesting Officer

C. MARSHALL DANN
Commissioner of Patents